United States Patent
Shimamura et al.

(10) Patent No.: US 7,367,244 B2
(45) Date of Patent: May 6, 2008

(54) OPERATING POSITION SELECT DEVICE FOR AUTOMATIC TRANSMISSION

(75) Inventors: Yuzo Shimamura, Tokyo (JP); Mitsuo Kikkawa, Atsugi (JP); Yuichi Tanii, Atsugi (JP); Hiroyuki Ikari, Sagamihara (JP)

(73) Assignee: Calsonic Kansei Corporation, Tokyo (JP)

( * ) Notice: Subject to any disclaimer, the term of this patent is extended or adjusted under 35 U.S.C. 154(b) by 743 days.

(21) Appl. No.: 10/974,975

(22) Filed: Oct. 28, 2004

(65) Prior Publication Data

US 2005/0139030 A1 Jun. 30, 2005

(30) Foreign Application Priority Data

Oct. 29, 2003 (JP) ............................. 2003-369415

(51) Int. Cl.
*F16H 59/00* (2006.01)
(52) U.S. Cl. ..................... 74/335; 74/473.12; 74/473.1
(58) Field of Classification Search ................ 74/335, 74/473.12, 473.1, 473.3, 473.21, 473.25
See application file for complete search history.

(56) References Cited

U.S. PATENT DOCUMENTS

| | | | |
|---|---|---|---|
| 5,537,885 A | 7/1996 | Thomas | |
| 5,758,543 A * | 6/1998 | Bair | 74/473.36 |
| 5,868,034 A * | 2/1999 | McFadden | 74/335 |
| 5,904,635 A * | 5/1999 | Genise et al. | 477/111 |
| 6,067,871 A | 5/2000 | Markyvech et al. | |
| 6,072,390 A * | 6/2000 | Dourra et al. | 340/456 |
| 6,357,319 B2 * | 3/2002 | Benda et al. | 74/502.4 |
| 6,361,473 B1 * | 3/2002 | Mason et al. | 477/124 |
| 7,231,846 B2 * | 6/2007 | Marhefka et al. | 74/473.21 |

FOREIGN PATENT DOCUMENTS

| | | |
|---|---|---|
| DE | 100 51 210 A1 | 4/2002 |
| EP | 0 872 670 A2 | 10/1998 |
| EP | 1 437 533 A1 | 7/2004 |
| FR | 2 796 116 A1 | 1/2001 |
| JP | 9-323559 A | 12/1997 |
| JP | 2003-97694 A | 4/2003 |

OTHER PUBLICATIONS

U.S. Appl. No. 10/974,981, filed Oct. 28, 2004, Kozu et al.

* cited by examiner

*Primary Examiner*—David M. Fenstermacher
(74) *Attorney, Agent, or Firm*—Foley & Lardner LLP (57) ABSTRACT

An operating position select device has a select lever unit, a mode shift unit to shift operation modes of the automatic transmission, a mechanically connecting means connecting them, and an assist actuator to assist a select lever. A control unit that controls the actuator is electrically connected to an operating position sensor detecting an operating position of the select lever and an operating velocity detector detecting operating velocity of the lever. The control unit has an excessive movement prevention part that reduces the assist force when the operating velocity outputted from the operating velocity detector exceeds a velocity threshold.

16 Claims, 8 Drawing Sheets

OPERATING POSITION SELECT DEVICE FOR AUTOMATIC TRANSMISSION

BACKGROUND OF THE INVENTION

1. Field of the Invention

The present invention relates to an operating position select device for an automatic transmission by which a driver can select by operating a select lever one of select mode positions corresponding to a plurality of operation modes of the automatic transmission.

2. Description of the Related Art

An operating position select device for an automatic transmission of this kind is disclosed in Japanese patent laying-open publication (Tokkaihei) No. 9-323559. This select device includes a select lever unit disposed near a driver's seat in a passenger compartment and a mode shift unit mounted on an automatic transmission. The select lever unit has a select lever manually operated by a driver and is connected with the mode shift unit by a connecting mechanism, such as a control cable, or a connecting linkage, which transmits an operating force applied on the select lever by the driver to the mode shift unit to shift operation modes of the automatic transmission.

The conventional art, however, has a problem that the select lever unit needs a long select lever in order to operate it without a large operating force of the driver, which reduces design freedom concerning an installation location of the select lever unit and/or a layout of a passenger compartment.

This reason comes from the fact that a length of the select lever is determined so that a driver can easily operate the select lever and its operating torque must overcome frictional resistance of the connecting mechanism and the like. Namely, the operating torque, generated by the operating force on the select lever, has to be larger than torque caused by the sum of the frictional resistance in the connecting mechanism and resistance generated when a detent pin, which moves with the select lever, gets over a cam top portion of a detent plate during select operation, although the operating force of the driver is limited to a certain extent. Accordingly, to satisfy both of the above requirements the select lever needs to be longer than a certain length, typically to be 350 mm.

Another operating position select device for an automatic transmission of this kind is disclosed in Japanese patent laying-open publication (Tokkai) No. 2003-97694. This select device is, what is called, a shift-by-wire type one. It has a select lever manually operated by a driver, a select position detector for detecting a position of the select lever, a mode shift unit mounted on an automatic transmission for shifting its operation modes, an electric motor for driving a mode shift unit, and a control unit for controlling the electric motor based on an output signal from the detector.

This select device is suitable for shortening a length of the select lever and expanding design freedom for its installation location and/or layout of a passenger compartment, while the select device lacks a mechanical connection between the select lever and the mode shift unit. This lack of the mechanical connection results in a problem that the mode shift unit can not be sifted despite of operating the select lever in case of electrical failure such that an electric wire is broken, or the select position detector or the control unit fails.

It is, therefore, an object of the present invention to provide an operating position select device for an automatic transmission which overcomes the foregoing drawbacks and can expand design freedom concerning layout of a passenger compartment and/or an installation location of a select lever unit, and drive a mode shift unit despite of electric failure of the operating position select device, and prevents an excessive movement of the select lever in select operation.

SUMMARY OF THE INVENTION

According to the first aspect of the present invention there is provided an operating position select device for an automatic transmission whose operation modes are shiftable, the operating position select device comprising: a select lever unit having a select lever that is operated by a driver between a plurality of select positions corresponding to the operation modes; an operating position sensor that detects an operating position of the select lever and outputs an operating position signal; a mode shift unit mounted on the automatic transmission to shift operation modes of the automatic transmission; a mechanically connecting means that mechanically connects the select lever and the mode shift unit with each other; an assist actuator that is arranged between the select lever and the mode shift unit and supplies assist force to the shift lever; an operating velocity detector that detects operating velocity of the select lever; and a control unit that controls the assist actuator based on at least the operating position signal, the control unit having an excessive movement prevention part that reduces the assist force when the operating velocity outputted from the operating velocity detector exceeds a velocity threshold.

Preferably, the excessive movement prevention part decreases the assist force with increasing an excess amount of the operating velocity over the velocity threshold.

Preferably, the excessive movement prevention part is provided with an excessive movement velocity map that has data on the velocity thresholds determined based on at least the operating position.

Preferably, the excessive movement prevention part is provided with a reaction force map that has data on reaction force acting on the select lever determined based on at least the operating position.

Preferably, the excessive movement prevention part rewrites the data of the reaction force map based on at least one of the operating position, the operating velocity, an operating force applied to the select lever, and the assist force.

Preferably, the velocity threshold corresponds to a maximum velocity at which the select lever is estimated to halt within an oncoming select position based on at least one of the operating velocity and an operating force applied to the select lever.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication.

An operating position select device of a first preferred embodiment according to the present invention will be described with reference to the accompanying drawings.

Figure 1:
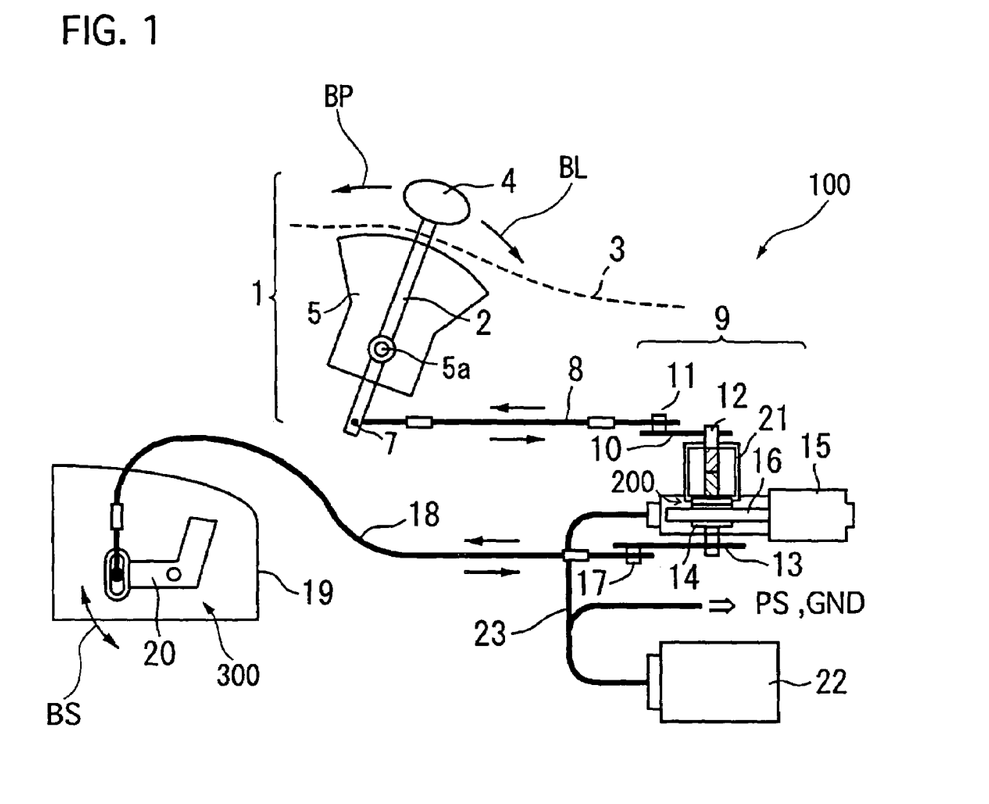
FIG. 1 is a schematic diagram showing a structure of an automatic transmission with an operating position select device of a preferred first embodiment according to the present invention.

Referring to FIG. 1 of the drawing, there is shown an automatic transmission 19 and an operating position select device 100 to control the transmission 19.

The automatic transmission 19 is a conventional multi-speed transmission with a plurality of planetary gear sets, not shown, and operated among a plurality of operation modes, for example, a parking mode, a reverse drive mode, a neutral mode, a forward drive mode, and a forward low gear drive mode.

The automatic transmission 19 is provided with the operating position select device 100, which shifts the operation modes to a desirable operation mode by manually selecting a select lever 2 of the select device 100.

The operating position select device 100 includes a select lever unit 1 manually operated by a driver, an operating angle sensor 200 for detecting an operating angle of the select lever 2, an mode shift unit 300 mounted on the automatic transmission 19, a first and second control cables 8 and 18 connecting the select lever 2 to the mode shift unit 300, an assist actuator 9 for assisting operating force inputted to the select lever 2 by the driver, an operating torque sensor 200 for detecting operating force applied to the select lever 2, and a control unit 22 for controlling the assist actuator 9.

The select lever unit 1 is arranged, for example, at a center console 3 beside a driver's seat and has the select lever 2 operated by the driver, a bracket 5 fixed to a vehicle body, a supporting shaft 5a fixed on the bracket 5 so as to swingably support the select lever 2, a knob 4 that is mounted on the top of the select lever 2 so as to be held by a hand of the driver, and a checking mechanism, not shown, for ensuring the select lever 2 to be kept in a selected mode position.

The select lever 2 is set to be about 100 mm in length in this embodiment, which is shorter by about 250 mm than a conventional type select lever. The lever 2 is operable by the driver swingably in a first direction toward a P position as indicated by an arrow B$_P$ and a second direction, opposite to the first direction, toward a L position as indicated by an arrow B$_L$.

The select lever 2 can be positioned in one of select positions: the P position corresponding to the parking mode of the automatic transmission 19, an R position corresponding to the reverse drive mode, an N position corresponding to the neutral mode, a D position corresponding to the forward drive mode, and the L position corresponding to the forward low geared drive mode.

Figure 2:
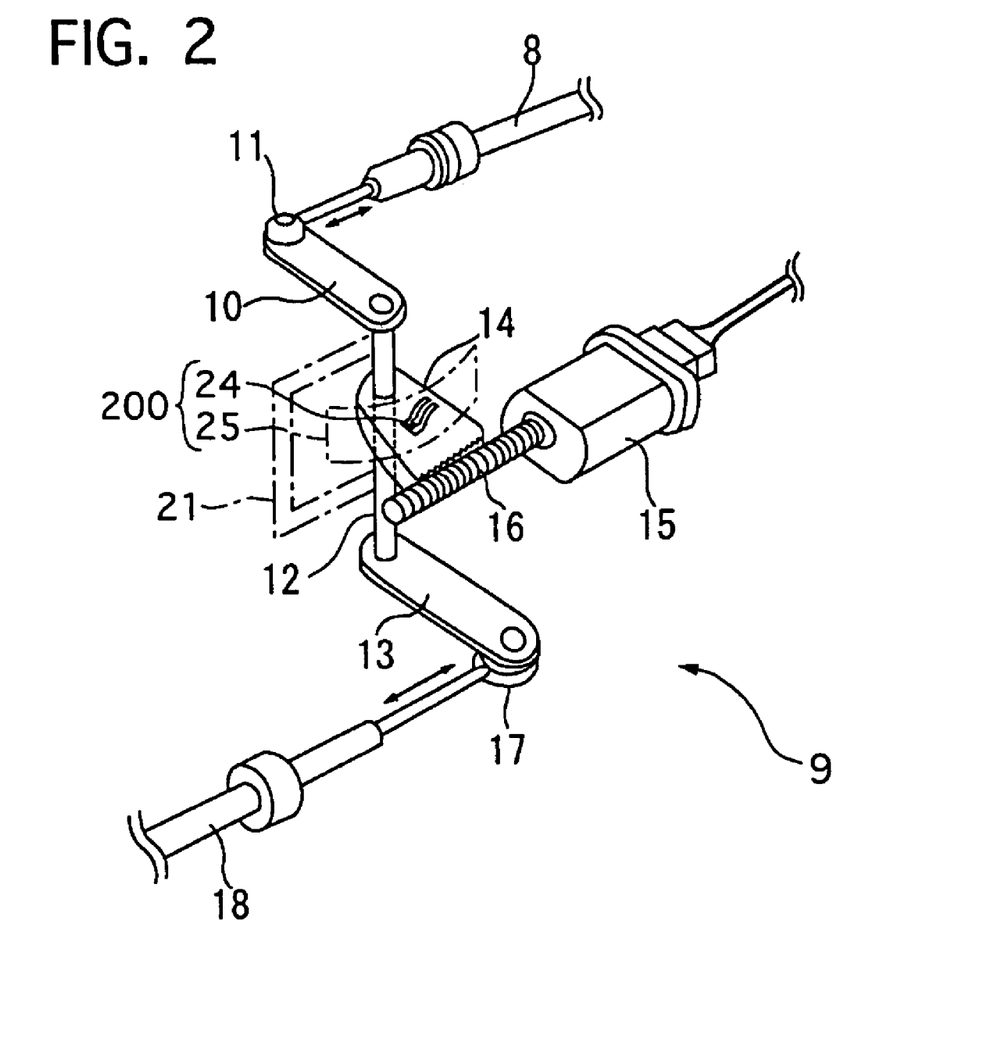
FIG. 2 is an enlarged perspective view showing an assist actuator that is used in the operating position select device shown in FIG. 1.

The assist actuator 9, as shown in FIGS. 1 and 2, includes an electric motor 15 with reduction gears reducing rotation speed of an output shaft of the motor 15, a worm 16 that is formed on the outer peripheral surface of the output shaft, and a worm wheel 14 that is in mesh with the worm 16 and integrally united to the coupling shaft 12 coupling the first and second control cables 8 and 18.

The worm wheel 14 is provided on its upper surface with an electric terminal 24 contacting to a carbon resistor 25, indicated by a dashed line in FIG. 2, that is printed on a substrate fixed to a case of the assist actuator 9. The electric terminal 24 and the carbon resistor 25 constitute the operating angle sensor 200 for detecting an operating angle of the select lever 2 to output an operating angle signal to the control unit 22.

The electric terminal 24 is movable together with and around the coupling shaft 12 to change its position with respect to the carbon resistor 25 that is immobile and detects a rotating angle of the coupling shaft 12 for outputting the operating angle signal. The operating angle signal is, for example, proportional to the operating angle of the select lever 2, both of which increase as the select lever 2 moves toward the L position, in the second direction B$_L$. The operating angle sensor 200 corresponds to an operating position sensor of the present invention, and the operating angle signal corresponds to an operating position signal of the present invention.

There is provided a torque sensor 21 attached to the coupling shaft 12 so as to detect the operating force applied to the select lever 2, which is proportional to operating torque applied to the coupling shaft 12. The torque sensor 21 detects the operating force based on relative torsion between the upper and lower portions of the coupling shaft 12 and outputs an operating force signal to the control unit 22. The operating force signal, for example, increases with the operating force applied to the select lever 2. The torque sensor 21 corresponds to an operating force sensor of the present invention.

Figure 3:
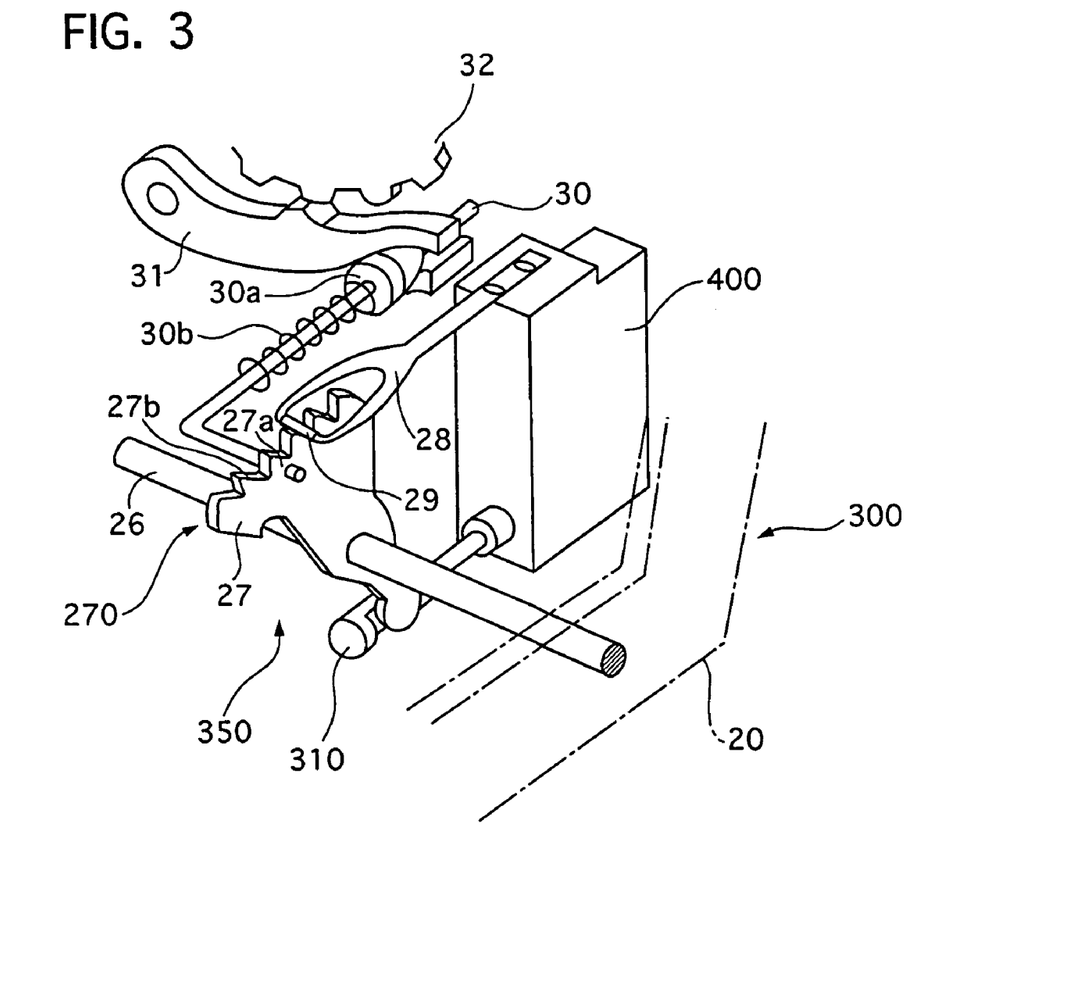
FIG. 3 is an enlarged perspective view showing a mode shift unit with a detent mechanism that is used in the operating position select device shown in FIG. 1.

The mode shift unit 300 shifts the operation modes of the automatic transmission 19 according to an operated position of the select lever 2. Referring to FIGS. 1 and 3 of the drawings, the mode shift unit 300 has a manual plate lever 20 and a detent mechanism 350 for keeping the manual plate lever 20 in a position selected by the select lever 2.

The manual plate lever 20 is integrally fixed in its intermediate portion with a rotary shaft 26, and connected at its one end portion with the second control cable 18 so as to be rotated on the shaft 26 with respect to a case of the transmission 19 according to select operation of the select lever 2. The rotary shaft 26 is fixed to a detent plate 27 of the detent mechanism 350.

The detent mechanism 350 includes the detent plate 27 with a cam 270, a detent pin 29 to be pressed onto the cam 270, and a spring plate 28 acting its spring force on the detent pin 29.

The detent plate 27 is mechanically connected with a valve spool 310 of a manual valve disposed in a control valve unit 400 of the automatic transmission 19 so as to move the spool 300 according to a select position. The detent plate 27 is formed on its upper portion with the cam 270 having top portions 27a and bottom portions 27b. Each bottom portion 27b is arranged between the adjacent top portions 27a and corresponds with one of the five operation modes of the automatic transmission 19.

The cam 270 is pressed by the detent pin 29 that is urged by the spring plate 28. The spring plate 28 is mounted at its one end portion on the control valve unit 400 and supports the detent pin 29 at its other end portion. The spring plate 28 presses the detent pin 29 onto the cam 270 of the detent plate 27 so that the detent pin 29 is positioned in one of the bottom portions 27b to detain the valve spool 310 of the manual valve in the selected position.

The detent plate 27 is coupled at its cam side portion with a parking rod 30 having a wedge 30a that can press a parking pawl 31. The wedge 30a is movable along the rod 30 and presses the parking pawl 31 by spring force of a coil spring 30b so that the pawl 31 engages with a parking wheel 32 united to an output shaft of the automatic transmission 19 when the select lever 2 is shifted to the P position. This engagement of the pawl 31 and the wheel 32 results in locking drive wheels, not shown, for parking a motor vehicle.

The mode shift unit 300 is mechanically connected with the select lever 2 through the first and second control cables 8 and 18, and others. As shown in FIGS. 1 and 2, the first control cable 8 connects at its one end portion with a bottom portion of the select lever 2 through a first joint 7 and at the other end portion with one end portion of an input lever 10 through a second joint 11. The other end portion of the input lever 10 is connected with a top portion of a coupling shaft 12, whose bottom portion is connected with one end portion of an output lever 13. The other end portion of the output lever 13 is connected with one end portion of the second control cable 18 through a third joint 17. The other end portion of the second control cable 18 is, as shown in FIGS. 1 and 3, connected with the manual plate lever 20.

The first and second control cables 8 and 18, the first to third joints 7, 11, and 17, the input and output plates 10 and 13, and the coupling shaft 12 corresponds to a mechanically connecting means of the present invention.

The control unit 22 is electrically connected to a power supply PS, ground GND, the operating angle sensor 200, and the torque sensor 21. The control unit 22 receives the operating angle signal from the operating angle sensor 200 and the operating force signal from the torque sensor 21 to compute target assist current based on these signals, and drives the electric motor 15 under pulse width modulation (PWM) control based on the target assist current.

Figure 4:
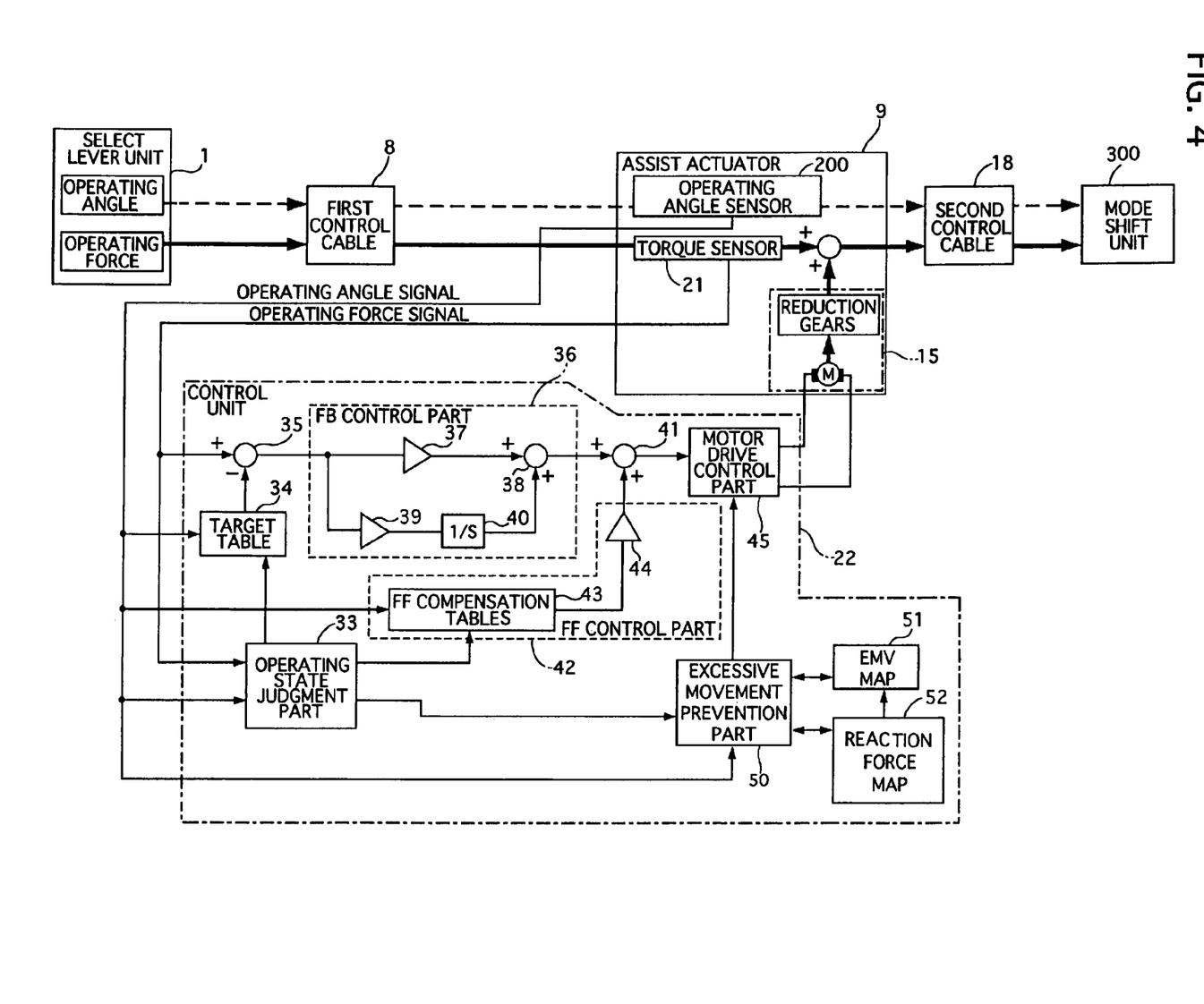
FIG. 4 is a control bock diagram of a control unit and its peripheral equipment that are used in the operating position select device shown in FIG. 1.

FIG. 4 shows a control block diagram of the control unit 22 and its related units. When the select lever 2 is shifted by a driver, the select lever 2 moves and changes its operating angle, and operating force applied to the lever 2 by the driver is transmitted to the mode sift unit 300 through the first and second control cables 8 and 18, and the coupling shaft 12.

The first control cable 8 rotates the coupling shaft 12, so that the terminal 24 on the worm wheel 14 united with the shaft 12 moves with respect to the carbon resistance 25 to change a relative angle between them. This relative angle, corresponding to an operating angle of the select lever 2, is detected by the operating angle sensor 200, which outputs an operating angle signal to the control unit 22.

Operating force applied to the select lever 2 is transmitted through the first control cable 8 to the coupling shaft 12 and twists it, so that torsion occurs between the upper and lower portions of the shaft 12. This torsion, corresponding to operating force applied to the select lever 2, is detected by the torque sensor 21, which outputs an operating force signal to the control unit 22.

The control unit 22 has an operating state judgment part 33 that judges a states of the select lever 2, an excessive movement prevention part (hereinafter referred to as "EMP") control part 50 that prevents the select lever 2 from passing over a desired select position, a motor drive control part 45 that controls electric current to be supplied to the electric motor 15 of the assist actuator 9, a feedback (hereinafter referred to as "FB") control part 36, and a feedforward (hereinafter referred to as "FF") control part 42.

The operating state judgment part 33 calculates the operating angle of the select lever 2 based on the operating angle signal outputted from the operating angle sensor 200 and obtains operating velocity and acceleration of the select lever 2 by computing differential of the operating angle and the operating velocity, respectively. Then, the judgment part 33 judges an operating start-up and an operating direction of the select lever 2 based on the operating angle, the operating velocity, and the operating force outputted from the torque sensor 21 and outputs a judgment result to the FF control part 42, a target table 34, and the EMP control part 50. This judgment part 33 corresponds to an operating velocity detector of the present invention.

The FF control part 42 has FF compensation tables 43 and a multiplier 44. The FF compensation tables 43 determines FF current based on the operating angle, the operating velocity, and the operating acceleration and outputs an FF current signal to the multiplier 44, where multiplies the FF current signal by FF gain to output the multiplied FF assist current signal to a third adder 41.

The target table 34 receives the operating angle signal from the operating angle sensor 200 and an operating direction signal from the operating state judgment part 33 to determine target reaction force based on them. Then, the target table 34 outputs this target reaction force signal to a first adder 35. The target table 34 contains data on target reaction forces with respect to operating angles and directions.

The first adder 35 computes a difference between the detected operating force and the target reaction force by subtracting the target reaction force signal from the operating force signal and outputs its difference signal to the FB control part 36.

The FB control part 36 includes a first multiplier 37, a second adder 38, a second multiplier 39, and an integral element 40. The first multiplier 37 computes first proportional current by multiplying the difference signal by proportional gain and outputs a first proportional current signal to the second adder 38. The second multiplier 39 computes a second proportional current by multiplying the difference signal by an integral gain and outputs a second proportional signal to the integral element 40. The integral element 40 obtains integral current by calculating integration of the second proportional signal and outputs its integral current signal to the second adder 38. The second adder 38 adds the integral current signal to the first current signal and outputs an FB assist current signal to the motor drive control part 45.

The third adder 41 adds the FF assist current signal outputted from the FF control part 42 to the FB assist current signal outputted from the FB control part 36 and outputs a motor assist current signal to the motor drive control part 45.

The EMP control part 50 receives the operating angle signal from the operating angle sensor 200, the operating velocity signal from the operating state judgment part 33, and an operating reaction force signal outputted from a reaction force map 52 to refer to an excessive movement velocity (hereinafter referred to as "EMV") map 51 and obtains a velocity threshold that the reaction force map 52 determines based on the operating angle and velocity and the operating reaction force. The control part 50 judges whether or not the operating velocity detected is larger than the velocity threshold. An EMP signal is outputted from the control part 50 so as to reduce motor assist current when the judgment result is YES to the motor drive control part 45.

The EMV map 51 has data on velocity thresholds with respect to the operating angles, the operating velocities, and the operating reaction forces. The velocity threshold corresponds to a maximum velocity at which the select lever 4 is estimated to halt within an oncoming select position based on at least one of the operating velocity and an operating force applied to the select lever. Accordingly, the select lever 2 does not pass over the oncoming select position when the operating velocity of the lever 2 is smaller than the velocity threshold.

Figure 7:
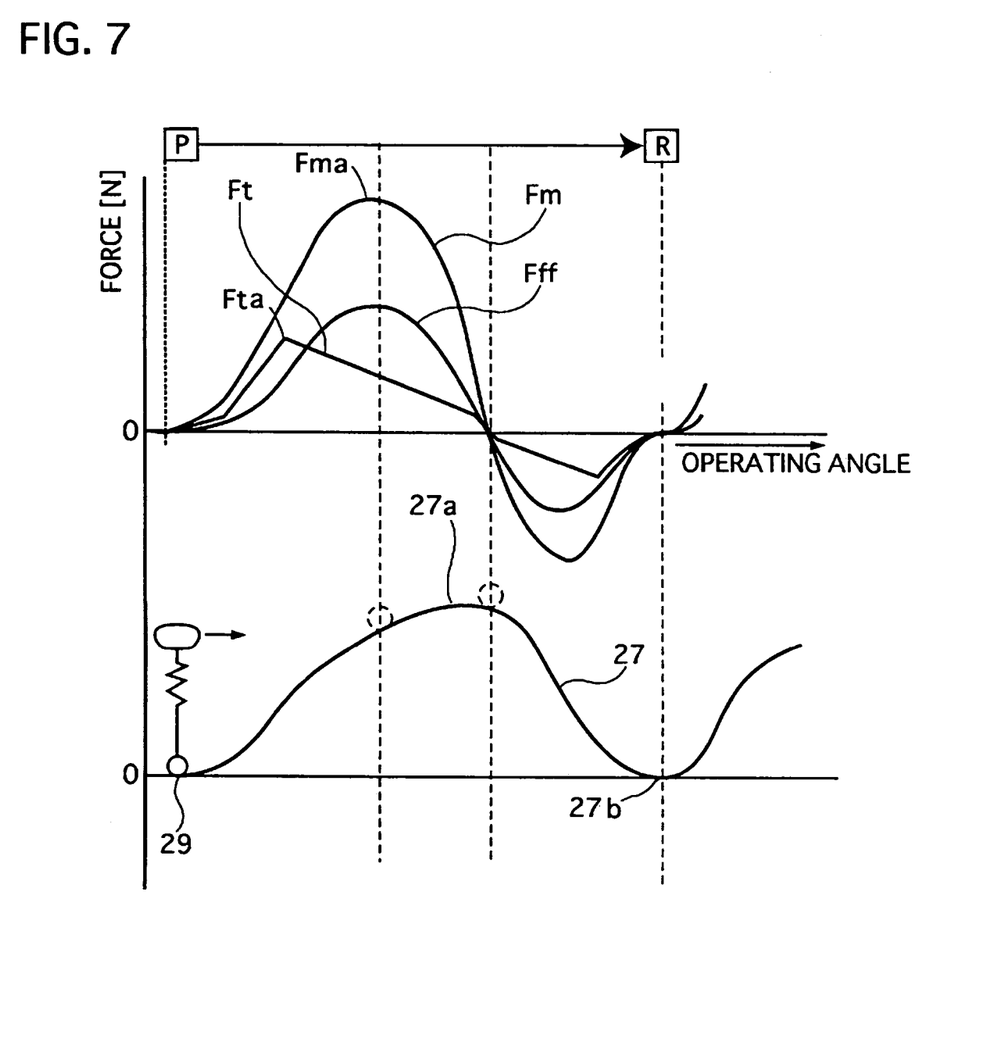
FIG. 7 is a schematic diagram showing relationships of reaction force acting on a select lever, target reaction force, feedforward assist force, and a cam profile of a detent mechanism with respect to an operating angle when the select lever is shifted from P position to R position.

The reaction force map 52 has data on a characteristic of operating reaction force with reference to the operating angle of the select lever 2, for example, shown in FIG. 7. This data is rewritten based on at least one of the operating force, the operating angle, the operating velocity, and the target assist force at anytime. The target assist force is determined according to the motor assist current signal. When the date of the reaction force map 52 is rewritten, the excessive movement velocity map 51 is rewritten.

The motor drive control part 45 receives the motor assist current signal from the third adder 41 and the IHP signal from the IHP control part 50 and outputs motor drive current determined based on these signals to the electric motor 15 under Power Width Modulation (PWM) control. In stead of the PMW control, the motor 15 may be driven under other controls, such as current control or armature voltage control.

The motor 15 applied motor torque to the coupling shaft 12 so as to obtain resultant force by adding its assist force to the operating force in the select operation, so that the resultant force moves the first and second control cables 8 and 18, the select lever 2, and the mode shift unit 300 to shift the operation modes of the automatic transmission 19.

In the select device 100, when the operating position select unit 100 fails electrically because of a broken electric wire for example, the operating force of the select lever 2 is directly transmitted from the lever 2 to the mode shift unit 300 mechanically through the first and second control cables 8 and 18, the input and output levers 10 and 13 and the others, thereby enabling the mode shift unit 300 to shift the modes of the automatic transmission 19 although its operating force becomes larger than in a normal state.

Figure 5:
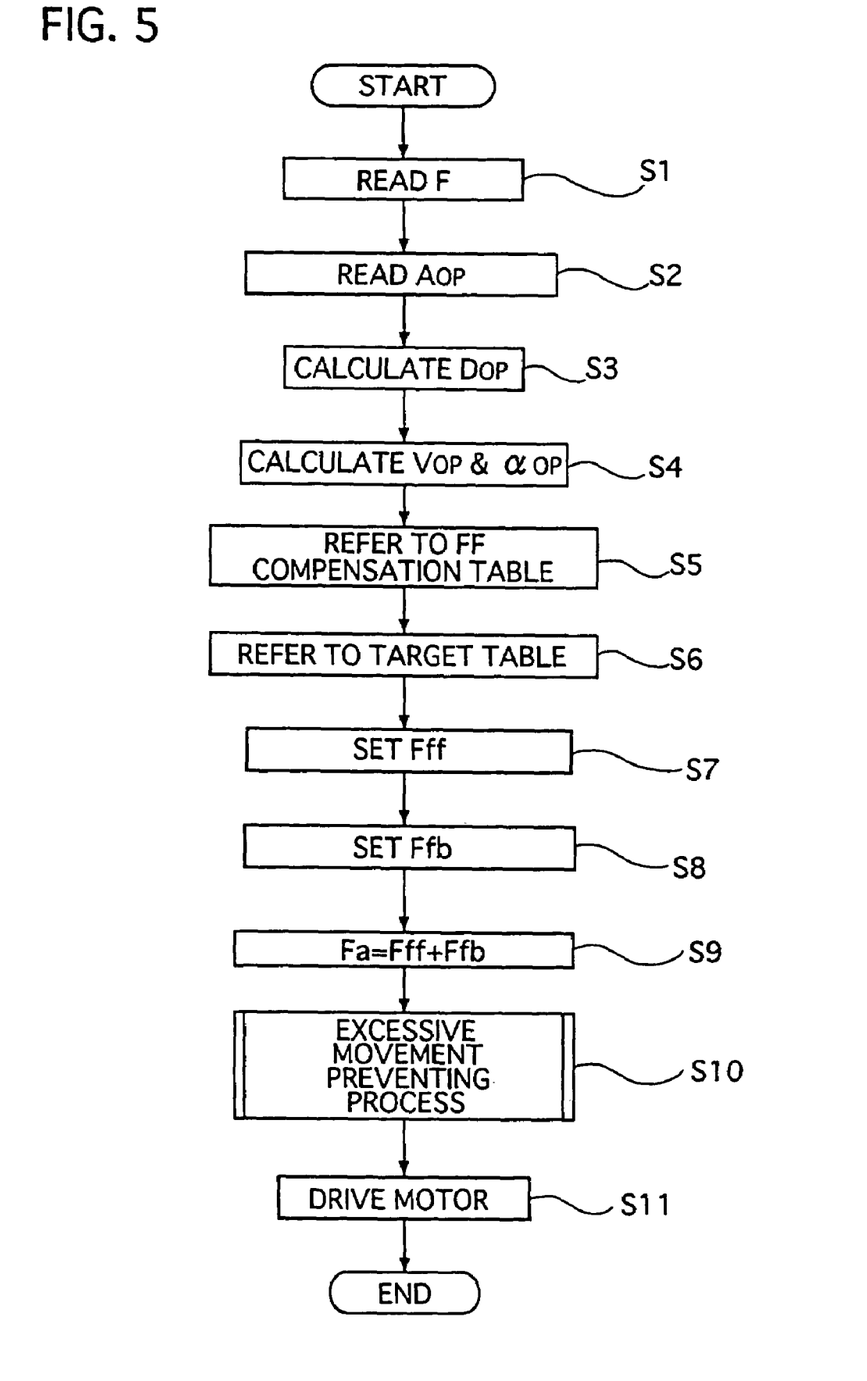
FIG. 5 is a flowchart of an assist process including an excessive movement preventing process executed in the control unit for controlling the assist actuator during select operation.

FIG. 5 shows a flowchart of an assist process executed in the control unit 22 to control the assist actuator 9 when the select lever 2 is operated by the driver.

At step S1, the control unit 22 receives an operating force signal from the torque sensor 21 to read operating force F applied to the select lever 2, and then the flow goes to step S2.

At the step S2, the control unit 22 receives an operating angle signal from the operating angle sensor 200 to read an operating angle $A_{OP}$ of the select lever 2, and then the flow goes to step S3.

At the step S3, the operating state judgment part 33 calculates an operating direction $D_{OP}$ of the select lever 2 based on a difference between the operating angle signals that are read control-periodically from the operating angle sensor 200, and then the flow goes to step 4.

At the step S4, the judgment part 33 computes operating velocity $V_{OP}$ and operating acceleration $α_{OP}$ based on the operating angle signals $A_{OP}$ that are read control-periodically from the operating angle sensor 200, and then the flow goes to step S5.

At the step S5, the FF control part 42 refers to the FF compensation tables 43 to select an optimum one from the tables 43 based on the operating angle $A_{OP}$, the operating velocity $V_{OP}$, and the operating acceleration $α_{OP}$, and then the flow goes to step S6.

At the step S6, the operating state judgment part 33 refers to the target table 34 to obtain target reaction force, and then the flow goes to step S7.

At the step S7, the FF control part 42 sets FF assist force Fff by using the optimum table and outputs it to the third adder 41, and then the flow goes to step S8.

At the step S8, the FB control part 36 sets FB assist force Ffb based on the target reaction force and outputs it to the third adder 41, and then the flow goes to step S9.

At the step S9, the third adder 41 obtains target assist force Fa by adding the FF assist force Fff to the FB assist force Ffb and outputs the target assist force Fa to the motor drive control part 45, and then the flow goes to step S10.

At the step S10, the excessive movement prevention part 50 executes an excessive movement preventing process, and then the flow goes to step S11. The excessive movement preventing process will be described in detail later.

At the step S11, the motor drive control part 45 outputs motor drive current controlled under PWM control to the electric motor 15, and the flow ends.

Figure 6:
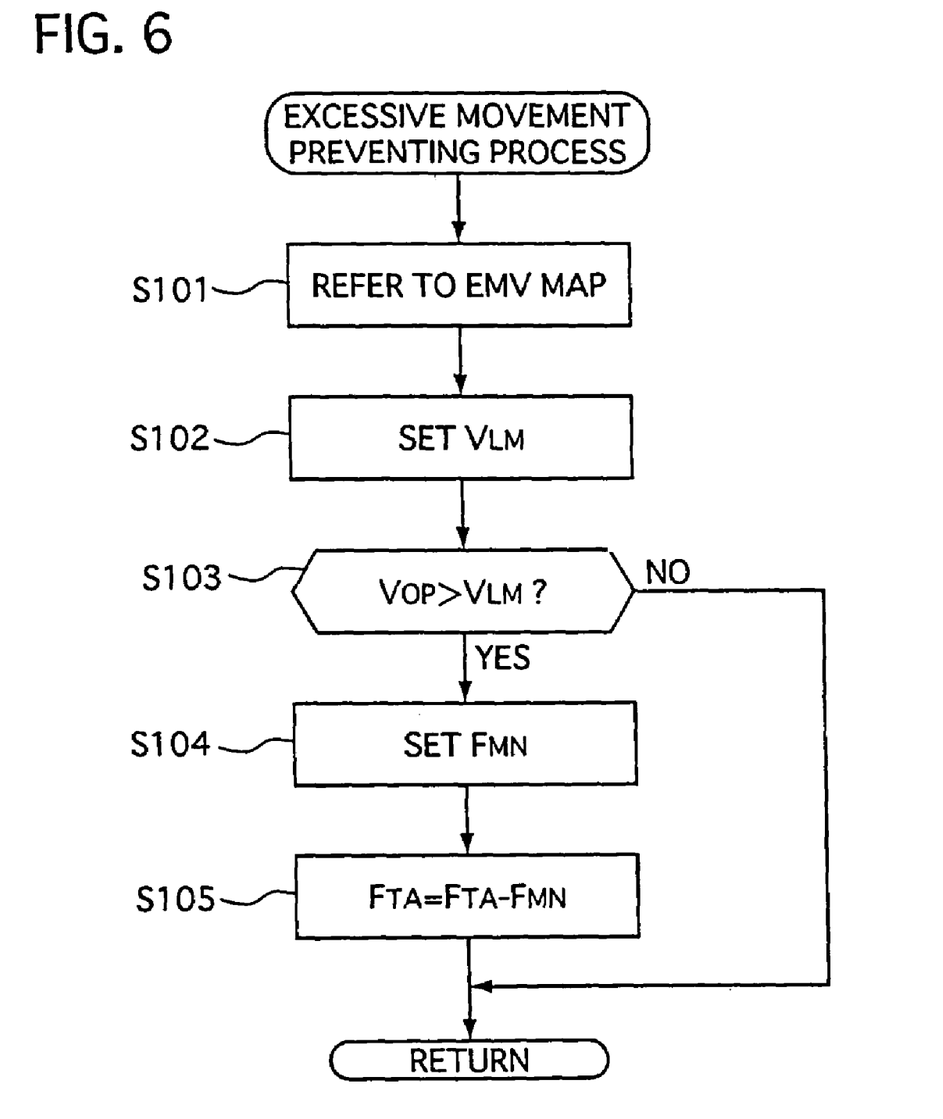
FIG. 6 is a flowchart of the excessive movement preventing process executed at step S10 in the flowchart shown in FIG. 5.

FIG. 6 shows a flowchart of the excessive movement preventing process executed at the step S10 in the flowchart shown in FIG. 5.

At step S101, the excessive movement prevention part 50 refers to the excessive movement velocity map 51, and then the flow goes to step S102.

At the step S102, a velocity threshold $V_{LM}$ is set based on the operating angle $A_{OP}$, and then the flow goes to step S103.

At the step S103, the prevention part 50 judges whether or not the operating velocity $V_{OP}$ obtained from the operating state judgment 33 is larger than the velocity threshold $V_{LM}$. If YES, the flow goes to step S104, while, if NO, the flow goes to RETURN.

At the step S104, subtraction force $F_{MN}$ is set based on the exceeding amount of the operating velocity $V_{OP}$ that is determined from a difference between the operating velocity $V_{OP}$ detected and the velocity threshold $V_{LM}$, and then the flow goes to step S105.

At the step S105, the target assist force $F_{TA}$ is determined by subtracting the subtraction force $F_{MN}$ from temporary target assist force $F_{TA}$ obtained from the third adder 41, and the flow goes to RETURN.

FIG. 7 shows characteristic relationships of the reaction force Fm, the target reaction force Ft, the FF assist force Fff, and a cam profile with respect to the operating angle $A_{OP}$, respectively, during the select operation from the P position to the R position.

The reaction force Fm acting on the knob 4 of the select lever 2 is obtained from the computation using select torque detected by the torque sensor 21 when the motor 15 is not driven in the select operation shifted from the Position to the R position. The reaction force Fm is generated by resultant force from the sum of friction force caused by the first and second cables 8 and 18, inertia force of the motor 15, spring force of the detent mechanism 350 and others. This reaction force Fm increases in a direction opposite to the operating direction of the lever 2 with the operating angle A$_{OP}$ to have its peak portion Fma before the detent pin 29 gets over the top portion 27a of the cam 270, and then decreases with increasing the angle A$_{OP}$.

After the pin 29 passes over the top portion 27a, the reaction force Fm acts on the select lever 2 in the operating direction so as to move it to the bottom portion 27b of the R position because the spring plate 28 applies its spring force through the detent pin 29 to the cam 270 to rotate, with pulling the select lever 2 into the bottom portion 27b of the R position. This denotes that the operating force applied to the select lever 2 needs to be larger than the reaction force Fm in order to manually move the select lever 2 for the select operation when the motor 15 is not driven.

The target reaction force Ft, which is set based on the operating angle A$_{OP}$ so as to obtain high select operating performance. The target reaction force Ft is determined according to the reaction force Fm. Note that a peak portion Fta of the target reaction force Ft is short of the peak portion Fma of the reaction force Fm in this embodiment.

The FF assist force Fff is set to be about a half of the reaction force Fm.

Figure 8:
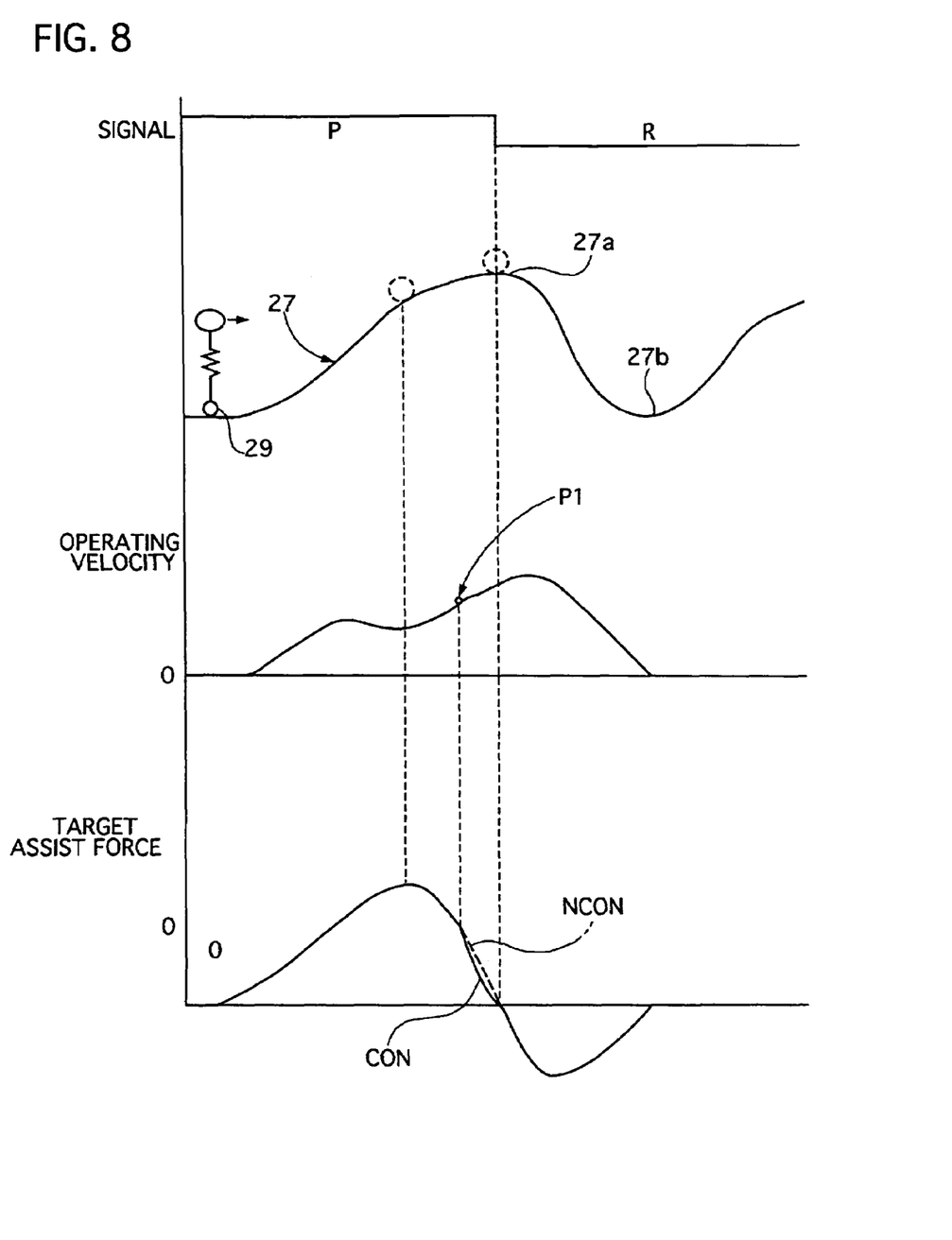
FIG. 8 is a schematic diagram showing relationships of a movement of a detent pin pressed on the cam of the detent mechanism, operating velocity of the select lever, and target assist torque with respect to select position signals when the select lever is shifted from the P position to the R position.

FIG. 8 is a diagram for the explanation of the excessive movement prevention process, and shows relationships of a movement of the detent pin 29 pressed onto the cam 270 of the detent mechanism 350, the operating velocity V$_{OP}$ of the select lever 2, and the target assist torque with respect to select position signals when the select lever 2 is shifted from the P position to the R position.

In the select operation, the detent pin 29 moves forward and backward together with the movement of the lever 2, providing the lever 2 with the reaction force in the operating direction or its opposite direction.

The reaction force Fm acts on the select lever 2 against the operating force until the detent pin 29 reaches the peak of the cam 270 because the detent plate 27 united with the manual plate lever 300 is biased by the spring force of the spring plate 28 in a direction opposite to the operating direction. In this operation zone, the operating force for moving the select lever 2 in the operating direction needs to overcome the reaction force produced by the spring force of the spring plate 28, and the lever 2 moves with increasing the amount of deformation of the spring plate 28. This results in increasing the reaction force acting on the lever 2.

When the detent pin 29 is on the peak, the reaction force in the operating direction and its opposite direction becomes zero, and the spring plate 28 is deformed to the maximum degree.

After the detent pin 29 passes over the peak until it reaches the bottom of the cam corresponding to the R position, the spring plate 28 starts to reduce its amount of deformation with applying the spring force to the detent plate 27, so that the detent plate 27 is pressed to rotate so that the lever 2 is assisted to move forward. In this operation zone, the reaction force Fm increases in the lever-assisting direction, and then decreases until the detent pin 29 reaches the bottom of the cam 270 corresponding the R position.

This reversing characteristic of the reaction force causes affects a select feeling and/or an excessive movement of the select lever 2; the driver can hardly feel the select position and/or he or she moves the lever 2 so that it passes over the desired select position. This excessive movement operation depends heavily on operating velocity of the lever 2; the possibility of the excessive movement increase with the operating velocity.

In order to prevent the excessive movement, the operating position select device 100 of the embodiment reduces the assist force when the operating velocity V$_{OP}$ is larger than the velocity threshold V$_{LM}$, thereby preventing the lever 2 to pass over the select position and ensuring its halt in the select position.

This operating position select device 100 of the first embodiment has many advantages described below.

The select lever 2 can be shorter than a conventional one by about 150 mm at its portion projecting from a center console toward a passenger compartment without increasing an operating force applied to the select lever 2 so much. This brings a design freedom concerning an installation location of the select lever and/or a layout of a passenger compartment to be broadened.

When operating the select lever 2, assist torque from the electric motor 15 is applied to the coupling shaft 12 of the mechanically connecting mechanism so as to reduce the operating force applied to the select lever 2. When the operating position select unit 100 fails electrically, a driver can shift the mode shift unit 300 by operating the select lever 2 because the select lever 2 and the mode shift unit 300 are mechanically connected by the mechanically connecting mechanism, such as the first and second control cables 8 and 18 and the others.

The assist control of the motor 15 are performed by using the FF and FB assist currents, which gives high response to select operation.

The deceasing of the assist force when the operating velocity V$_{OP}$ of the select lever 2 exceeds the velocity threshold VLM can prevent the lever 2 from its excessive movement, passing over the select position. The lever excessive movement can be prevented despite of the magnitude of the operating velocity because the assist force is decreased with increasing the operating velocity. This excessive movement preventing control can be performed without other additional device, which gives lower manufacturing cost. The EMV map offers a high response to high operating velocity of the lever 2. The rewriting data of the reaction force map 52 keeps ensuring lever excessive preventing control as the select device 100 is used for a long time.

While there have been particularly shown and described with reference to preferred embodiments thereof, it will be understood that various modifications may be made therein, and it is intended to cover in the appended claims all such modifications as fall within the true spirit and scope of the invention.

For example, the operating force F may be detected based on an estimate from supply current to the motor 15 and its rotational speed in stead of using the torque sensor 21.

The mechanically connecting mechanism may be rods or linkage instead of the first and second control cables 8 and 18 in the above embodiments. The select lever may be of a shape different from the above embodiments.

The select lever may have a configuration different from that of the first embodiment shown in FIG. 1, for example, a finger-controable one.

The configuration of the cam of the detent mechanism may be formed arbitrarily to have different target reaction force.

The ratio of the FF assist force Fff to the FB assist force Ffb may be set arbitrarily according to a target operating characteristics.

The assist force produced by the electric motor may be controlled based on at least the operating angle A$_{OP}$.

The subtraction force F$_{MN}$ may be set larger than the temporary target assist force Ft when the operating velocity or the operating force has a large value. In this case, the resultant target assist force Ft acts on the select lever 2 in the direction opposite to the operating direction of the lever 2.

The operating position can be detected by the displacement amount of the select lever 2 or the mechanically connecting mechanism 400 that connects the select lever 2 and the mode shift unit 300 with each other instead of the operating angle of the shift lever 2.

The entire contents of Japanese Patent Application (Tokugan) No. 2003-369415 filed Oct. 29, 2003 is incorporated herein by reference.

What is claimed is:

1. An operating position select device for an automatic transmission whose operation modes are shiftable, the operating position select device comprising:
    a select lever unit having a select lever that is operated by a driver between a plurality of select positions corresponding to the operation modes;
    an operating position sensor that detects an operating position of said select lever and outputs an operating position signal;
    a mode shift unit mounted on the automatic transmission to shift operation modes of the automatic transmission;
    a mechanically connecting means that mechanically connects said select lever and said mode shift unit with each other;
    an assist actuator that is arranged between said select lever and said mode shift unit and supplies assist force to said shift lever;
    an operating velocity detector that detects operating velocity of said select lever; and
    a control unit that controls said assist actuator based on at least the operating position signal, said control unit having an excessive movement prevention part that reduces the assist force when the operating velocity outputted from said operating velocity detector exceeds a velocity threshold.

2. An operating position select device for an automatic transmission as set forth in claim 1,
    wherein the excessive movement prevention part decreases the assist force with increasing an excess amount of the operating velocity over the velocity threshold.

3. An operating position select device for an automatic transmission as set forth in claim 2,
    wherein the excessive movement prevention part is provided with an excessive movement velocity map that has data on the velocity thresholds determined based on at least the operating position.

4. An operating position select device for an automatic transmission as set forth in claim 2,
    wherein the excessive movement prevention part is provided with a reaction force map that has data on reaction force acting on said select lever determined based on at least the operating position.

5. An operating position select device for an automatic transmission as set forth in claim 4,
    wherein the excessive movement prevention part rewrites the data of the reaction force map based on at least one of the operating position, the operating velocity, an operating force applied to said select lever, and the assist force.

6. An operating position select device for an automatic transmission as set forth in claim 2,
    wherein the velocity threshold corresponds to a maximum velocity, the maximum velocity at which said select lever is estimated to halt within an oncoming select position based on at least one of the operating velocity and an operating force applied to said select lever.

7. An operating position select device for an automatic transmission as set forth in claim 1,
    wherein the excessive movement prevention part is provided with an excessive movement velocity map that has data on the velocity thresholds determined based on at least the operating position.

8. An operating position select device for an automatic transmission as set forth in claim 7,
    wherein the excessive movement prevention part is provided with a reaction force map that has data on reaction force acting on said select lever determined based on at least the operating position.

9. An operating position select device for an automatic transmission as set forth in claim 8,
    wherein the excessive movement prevention part rewrites the data of the reaction force map based on at least one of the operating position, the operating velocity, an operating force applied to said select lever, and the assist force.

10. An operating position select device for an automatic transmission as set forth in claim 7,
    wherein the velocity threshold corresponds to a maximum velocity at which said select lever is estimated to halt within an oncoming select position based on at least one of the operating velocity and an operating force applied to said select lever.

11. An operating position select device for an automatic transmission as set forth in claim 1,
    wherein the excessive movement prevention part is provided with a reaction force map that has data on reaction force acting on said select lever determined based on at least the operating position.

12. An operating position select device for an automatic transmission as set forth in claim 11,
    wherein the excessive movement prevention part rewrites the data of the reaction force map based on at least one of the operating position, the operating velocity, an operating force applied to said select lever, and the assist force.

13. An operating position select device for an automatic transmission as set forth in claim 11,
    wherein the velocity threshold corresponds to a maximum velocity at which said select lever is estimated to halt within an oncoming select position based on at least one of the operating velocity and an operating force applied to said select lever.

14. An operating position select device for an automatic transmission as set forth in claim 4,
    wherein the excessive movement prevention part rewrites the data of the reaction force map based on at least one of the operating position, the operating velocity, an operating force applied to said select lever, and the assist force.

15. An operating position select device for an automatic transmission as set forth in claim 14,
    wherein the velocity threshold corresponds to a maximum velocity at which said select lever is estimated to halt within an oncoming select position based on at least one of the operating velocity and an operating force applied to said select lever.

16. An operating position select device for an automatic transmission as set forth in claim 1,
    wherein the velocity threshold corresponds to a maximum velocity, the maximum velocity being determined based on one when said select lever is estimated to be halted within an oncoming select position based on at least one of the operating velocity and an operating force applied to said select lever.

* * * * *